United States Patent
Kale

(10) Patent No.: US 11,587,314 B2
(45) Date of Patent: Feb. 21, 2023

(54) INTELLIGENT CORRECTION OF VISION DEFICIENCY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/843,787

(22) Filed: Apr. 8, 2020

(65) Prior Publication Data

US 2021/0319219 A1 Oct. 14, 2021

(51) Int. Cl.
| | |
|---|---|
| *G06V 20/20* | (2022.01) |
| *G06N 20/00* | (2019.01) |
| *G06N 5/04* | (2023.01) |
| *G06V 20/58* | (2022.01) |

(52) U.S. Cl.
CPC ............... *G06V 20/20* (2022.01); *G06N 5/04* (2013.01); *G06N 20/00* (2019.01); *G06V 20/582* (2022.01); *G06V 20/584* (2022.01)

(58) Field of Classification Search
CPC ........... G06K 9/00671; G06K 9/00825; G06K 9/00818; G06N 5/04; G06N 20/00; G06T 11/001
USPC ...................................................... 348/148
See application file for complete search history.

(56) References Cited

U.S. PATENT DOCUMENTS

| | | | |
|---|---|---|---|
| 8,493,198 B1 | 7/2013 | Vasquez et al. | |
| 10,853,839 B1 * | 12/2020 | Galep | G06N 20/00 |
| 2011/0229023 A1 * | 9/2011 | Jones | G06T 5/00 |
| | | | 382/162 |
| 2012/0206050 A1 * | 8/2012 | Spero | F21K 9/232 |
| | | | 315/152 |
| 2013/0335435 A1 | 12/2013 | Ambrus et al. | |
| 2016/0070965 A1 * | 3/2016 | Nelson | G06K 9/46 |
| | | | 382/104 |
| 2016/0162802 A1 * | 6/2016 | Chickering | G06N 20/00 |
| | | | 706/12 |
| 2018/0218433 A1 * | 8/2018 | Penner | G06N 20/00 |
| 2019/0208111 A1 * | 7/2019 | Wendel | H04N 5/23218 |
| 2019/0340924 A1 * | 11/2019 | Abari | G08G 1/09623 |
| 2020/0264005 A1 * | 8/2020 | Heo | G06F 3/167 |
| 2020/0401851 A1 * | 12/2020 | Mau | G06K 9/6259 |
| 2021/0183105 A1 * | 6/2021 | Sneyers | G06T 11/001 |

FOREIGN PATENT DOCUMENTS

| | | |
|---|---|---|
| CN | 106570494 | 4/2017 |
| KR | 20190001304 | 6/2019 |

* cited by examiner

*Primary Examiner* — Gims S Philippe
(74) *Attorney, Agent, or Firm* — Greenberg Traurig

(57) ABSTRACT

Methods, devices, and computer-readable media for generating color-neutral representations of driving objects are disclosed. In one embodiment, a method is disclosed comprising capturing an image, the image including an object of interest; identifying the object of interest in the image based on identifying one or more colors in the image; associating the object of interest with a known traffic object; identifying a color-neutral representation of the known traffic object; and displaying the color-neutral representation to a user.

20 Claims, 6 Drawing Sheets

INTELLIGENT CORRECTION OF VISION DEFICIENCY

FIELD OF THE TECHNOLOGY

At least some embodiments disclosed herein relate to image sensors in general and more particularly, but not limited to, intelligent image sensors having artificial intelligence engines to generate alternative representations of detected objects that rely on colors for identifying meaning.

BACKGROUND

Without the aid of technology, drivers with various vision deficiencies (e.g., colorblindness) can experience difficulties in distinguishing between roadway objects (e.g., signs, signals, etc.) that rely primarily on color for differentiation. Currently, however, many vehicles are equipped with cameras for performing other functions executed by vehicles (e.g., parking assistance etc.). Additionally, many vehicles incorporate a variety of displays such as heads-up displays and, more recently, augmented reality displays. However, no such system exists that generates color-neutral representations of roadway objects detected in cameras installed in vehicles. The disclosed embodiments solve these and other problems.

BRIEF DESCRIPTION OF THE DRAWINGS

The embodiments are illustrated by way of example and not limitation in the figures of the accompanying drawings in which like references indicate similar elements.

DETAILED DESCRIPTION

In the illustrated embodiment, an AI-capable camera can be used to detect important color signals in a road system and present augmented reality display to assist color-blind drivers. For example, some traffic signals/signs are based at least in part on colors for differentiation, which can be a challenge for color-blind drivers. An AI-capable camera can monitor the images of the roadway, recognize the traffic signals/signs based at least in part on their colors, and present the recognition results to the driver in a color-neural way to assist colorblind drivers. For example, an augmented reality (AR) display of the traffic signals/signs can be presented on the heads up display, the windshield, in the instrument panel, and/or via the infotainment system. For example, the recognized traffic light signals (e.g., green, red and yellow) can be presented using different icons and/or positions instead of different colors. To reduce distraction, an AI engine can be trained to determine the level of color blindness of the driver and customize the AR display according to the level of color blindness of the driver. For example, the AI engine can determine that the driver is likely to need assistance for the current situation by analyzing the image of the roadway and present the AR display on in response to a determination that the driver needs assistance for the current situation.

Figure 1:
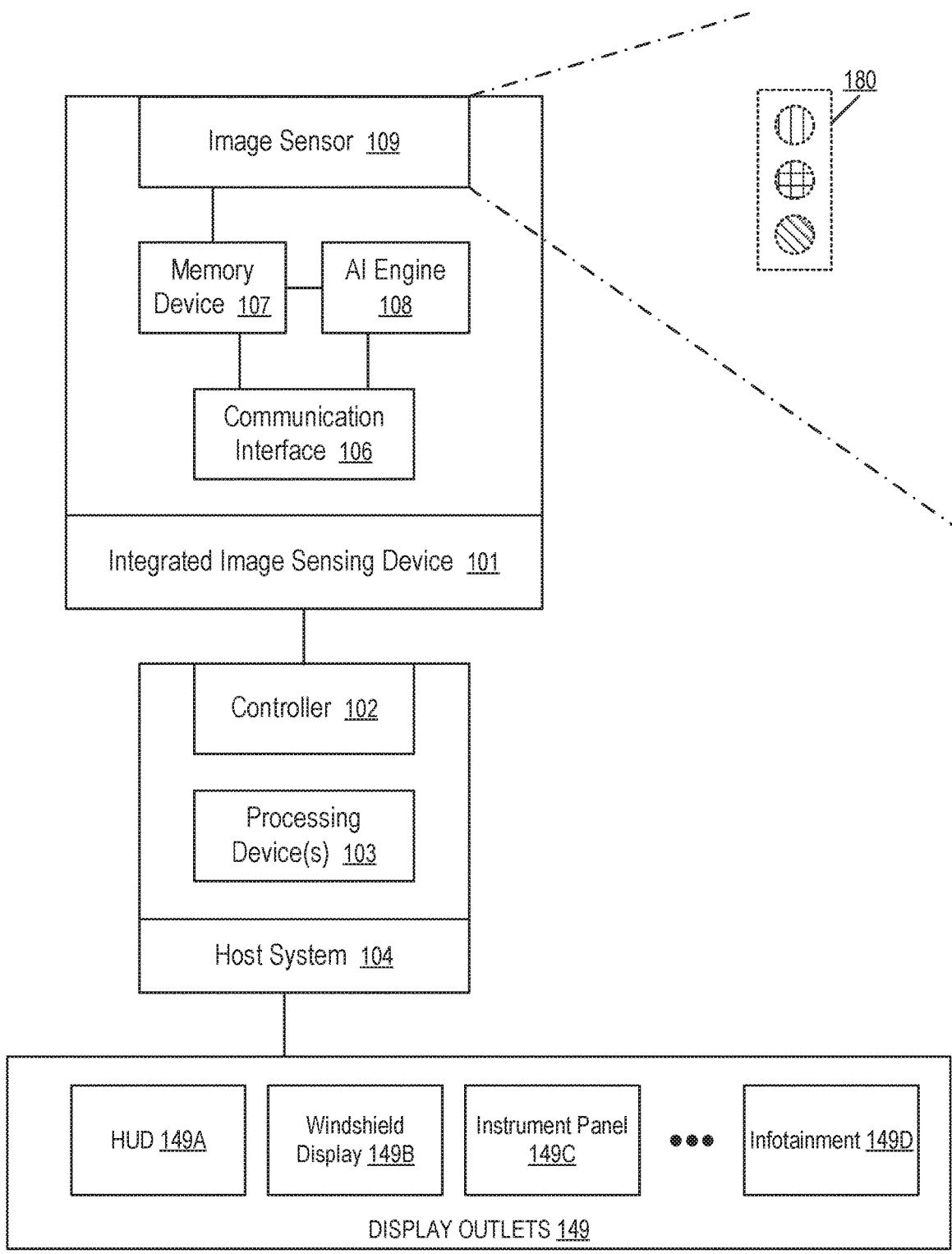
FIG. 1 shows an integrated image sensing device connected to a host system according to one embodiment.

FIG. 1 shows an integrated image sensing device (101) connected to a host system (104) according to one embodiment.

In FIG. 1, the integrated image sensing device (101) has an image sensor (109), a memory device (107), an artificial intelligence (AI) engine (108), and a communication interface (106).

In one embodiment, the image sensor (109), the memory device (107), the AI engine (108), and the communication interface (106) are formed on multiple integrated circuit dies that are stacked to form a Three-Dimensional Integrated Circuit (3D IC). Through-Silicon Via (TSV) can be used to implement high communication bandwidth among the image sensor (109), the memory device (107), and the AI engine (108). Further, the memory device (107) can be configured to accelerate and/or optimize the operations of the AI engine (108), as discussed further below.

Optionally, the integrated image sensing device (101) can be enclosed in one integrated circuit package with input/output connections to a controller (102) of the host system (104). For example, the integrated image sensing device (101) can be packaged as a BGA SSD that has the image sensor (109) and the AI engine (108). For example, the connection between the integrated image sensing device (101) and the host system (104) can be in accordance with a communication protocol for a Peripheral Component Interconnect Express (PCIe) bus, a Serial Advanced Technology Attachment (SATA) bus, a Universal Serial Bus (USB) bus, and/or a Storage Area Network (SAN).

In some implementations, the AI engine (108) includes programmable processing units; and the instructions for the processing units can be stored in the memory device (107) to customize the operations of the AI engine (108).

For example, an ANN model can be stored in the memory device (107); and the AI engine (108) is configured to apply the ANN model to the images from the image sensor (109) to generate inference results and store the inference results in the memory device (107). The host system (104) has one or more processing device(s) (103) and a controller (102) to access the communication interface (106) over the communication link between the integrated image sensing device (101) and the host system (104). The host system (104) can issue read commands to retrieve the inference results stored in the memory device (107). For example, the communication interface (106) can include an interface in accordance with a Non-Volatile Memory Host Controller Interface Specification (NVMHCIS) or NVM Express (NVMe). For example, the NVMe interface of the integrated image sensing device (101) can be used to receive data and commands from the host system (104). For example, the host system (104) can transmit write commands to store the ANN model into the memory device (107) of the integrated image sensing device (101) and read commands to retrieve inference results of the AI engine (108) from the memory device (107) in accordance with an NVMe protocol. For example, the communication interface (106) can be configured to allow the host system (104) to access the memory device (107) of the integrated image sensing device (101) as a Solid State Drive (SSD). Optionally, the communication interface (106) (or another interface) can include an NVMe interface for communicating with an external Solid State Drive (SSD) (e.g., separate from the integrated image sensing device (101) and the host system (104)) to store inference results generated by the AI engine (108) and/or image data generated by the image sensor (109) or derived from the images generated by the image sensor (109). As will be discussed, the integrated image sensing device (101) can be configured in a vehicle illustrated in FIG. 2.

In the illustrated embodiment, the host system (104) is communicatively coupled to a display system (149) which may include a heads-up display (149a), windshield display unit (149b), instrumental panel (149c), infotainment system (149d) as well as other graphical or audible display modules. In the illustrated embodiment, the host system (104) is configured to transmit appropriately formatted data to one or more of the modules in the display system (149). In the illustrated embodiment, the environment includes a traffic signal (180), although generally, any object may be included in the environment. In general, any traffic-related object that relies on color to convey meaning may be substituted in lieu of signal (180). The image sensor (109) captures an image of the environment, including the signal (180), and stores the captured image in the memory device (107). AI engine (108) processes the image and generates one or more inference outputs classifying the signal (108) and transmits the results of this classification to the host system (104) via the communication interface. In some embodiments, the image will be transmitted along with the classification output.

The host system (104) receives the classification output and (if implemented) the image via controller (102). The processing devices (103) then analyze the classification output and select an appropriate visualization of the classified signal (108). In some embodiments, these visualizations may be stored in a local storage device (not illustrated), while in other embodiments, they may be stored in a remote repository. The host system (104) then transmits this visualization to one or more of the display modules (149a, 149b, 149c, 149d) for display.

In addition to the foregoing, in some embodiments, the system is configured to refine the AI engine based on actions taken by the operator of the system. As described previously, the system may be implemented in a vehicle. In this manner, the method can identify the presence of a signal (180) and select a minimally invasive model that does not drastically change the visualization of the signal. For example, a minimally invasive model of a traffic signal may simply be a realistic depiction of the device, including the specific colors. The system can then analyze the behavior of the user in responding to the signal. If, for example, the user disobeys the signal, the method can refine the selection algorithm to chose a more drastically altered visualization. In another embodiment, the system can adjust the AI engine to only alter visualization for captured images that have a high likelihood of confusion. In this embodiment, the colors and color gradations in an image can be used to determine whether a user having color blindness is likely to not see the detected object (e.g., signal 180).

Further detail on these operations is provided in the following figures.

Figure 2:
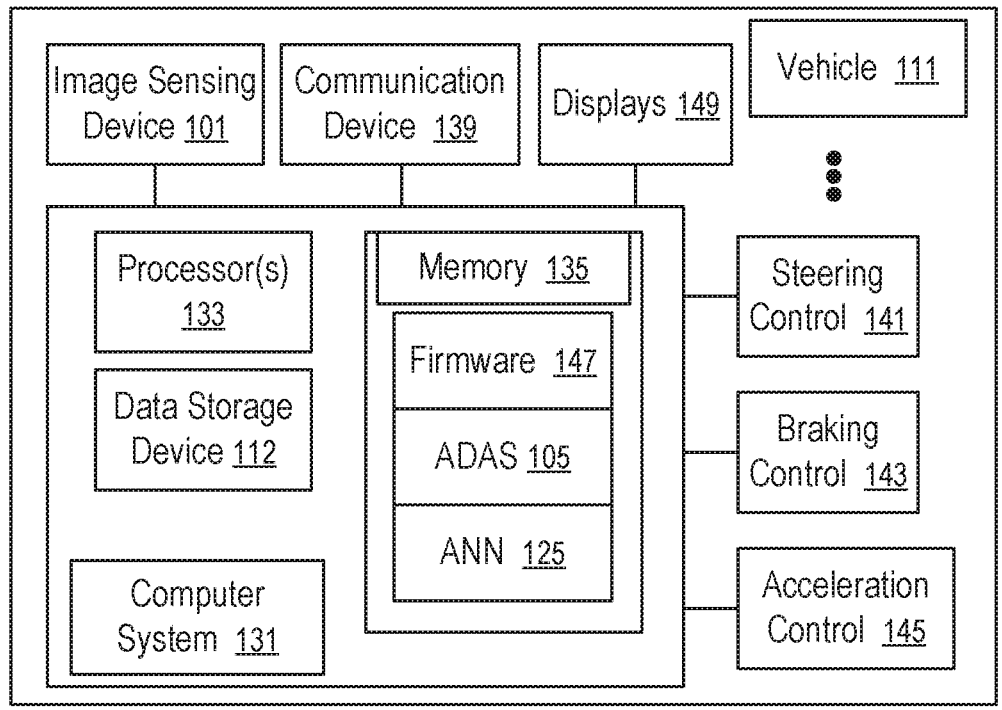
FIG. 2 shows an autonomous vehicle according to one embodiment.

FIG. 2 shows an autonomous vehicle (111) according to one embodiment. For example, the vehicle (111) in the system of FIG. 2 can be implemented using the autonomous vehicle (111) of FIG. 3.

In general, the vehicle (111) can include a display system (149), a communication device (139), one or more sensors (e.g., 101), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 2 has a similar configuration and/or similar components.

Figure 3:
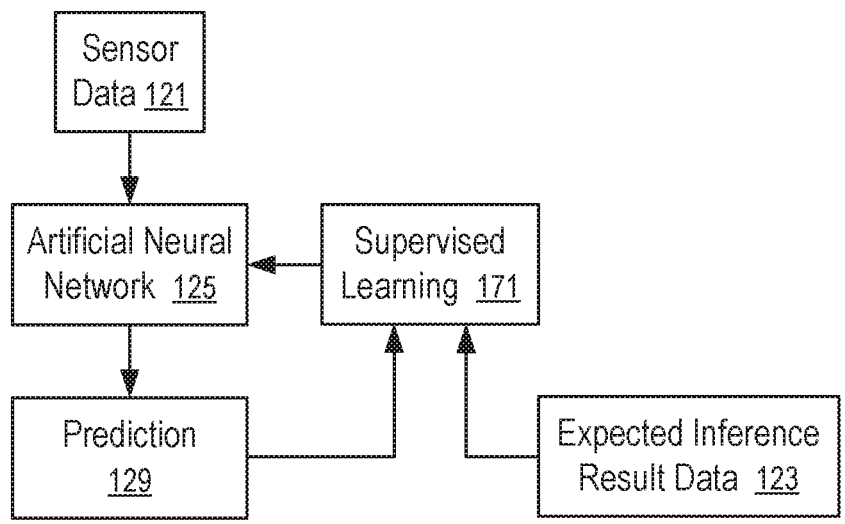
FIGS. 3-5 illustrate the training of artificial neural networks (125) for prediction according to some embodiments.

The vehicle (111) of FIG. 3 is configured with an Advanced Driver Assistance System (ADAS) (105). The ADAS (105) of the vehicle (111) can have an Artificial Neural Network (ANN) (125) for object detection, recognition, identification, and/or classification, based on images generated in the image sensing device (101). An image processing portion of the ANN (125) can be implemented using the integrated image sensing device (101) of FIG. 1.

At least a portion of the ANN (125) is implemented in the image sensing device (101) using its integrated inference engine (108).

For example, a portion of the ANN (125) that operates based on the images generated in the image sensing device (101) can be stored in the image sensing device (101). The inference engine (108) performs the communication according to the portion of the ANN (125) such that the amount of communications from the imaging sensing device (101) to the computer system (131) of the vehicle (111) include neuron outputs and/or inference results from the portion of the ANN (125) implemented in the image sensing device (101), but not the image data of individual pixels.

In some implementations, the computation of the portion of the ANN (125) implemented in the image sensing device (101) does not depend on sensor data that is not generated in the image sensing device (101).

Alternatively, the computation of the portion of the ANN (125) implemented in the image sensing device (101) can further be based on sensor data not generated in the image sensing device (101). For example, the computer system (131) provides the sensor data to the image sensing device (101) (e.g., by writing the sensor data into the memory device (107) through the communication interface (106)). By combining the sensor data provided by the computer system (131) and the image data generated by the image sensing device (101) according to the portion of the ANN (125) that is stored/implemented in the image sensing device (101), the amount of inference results from the image sensing device (101) can be reduced (e.g., in some ways of partitioning the ANN (125)). When data traffic of sending the relevant sensor data to the image sensing device (101) is smaller than the reduction in data size in inference results, sending the relevant sensor data for processing in the image sensing device (101) can be beneficial in reducing the overall communication traffic between the image sensing device (101) and the computer system (131) of the vehicle (111). Optionally, the selection of the portion of the ANN (125) for implementation in the image sensing device (101) can be based at least in part on the minimization of the data traffic between the image sensing device (101) and the computer system (131).

The computer system (131) of the vehicle (111) can include one or more processors (133), a data storage device (112), and memory (135) storing firmware (or software) (147), including the computer instructions and data models for ADAS (105).

Sensors of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensor(s) (e.g., 101) can provide a stream of real-time sensor data to the computer system (131). The sensor data generated by an image sensing device (101) of the vehicle (111) can include an image that captures an object using a camera that images using lights visible to human eyes, or a camera that images using infrared lights, or a sonar, radar, or LIDAR system. Preferably, the image is processed by the inference engine (108) of the image sensing device (101) to generate inference results as the output of the image sensing device (101) and thus reduce or eliminate the need to transmit pixel image data to the computer system (131).

For example, a camera having the image sensing device (101) can be used to obtain roadway information for the travel of the vehicle (111), which can be processed by the ANN (125) to generate control signals for the vehicle (111). For example, a camera having the image sensing device (101) can be used to record the exterior environment (including traffic signals) around the vehicle (111), which can be processed by the ANN (125) to classify objects and whether visualization changes are required for such objects.

The display system (149) of the vehicle (111) can be used to present data and/or inference results from the image sensing device (101). For example, compressed images with reduced resolution and refreshing frequency can be generated in the image sensing device (101) and transmitted to the display system (149) for presentation to an occupant of the vehicle (111). Optionally, the communication device (139) can establish a connection to a mobile device of an occupant of the vehicle (111) to make the presentation.

Figure 4:
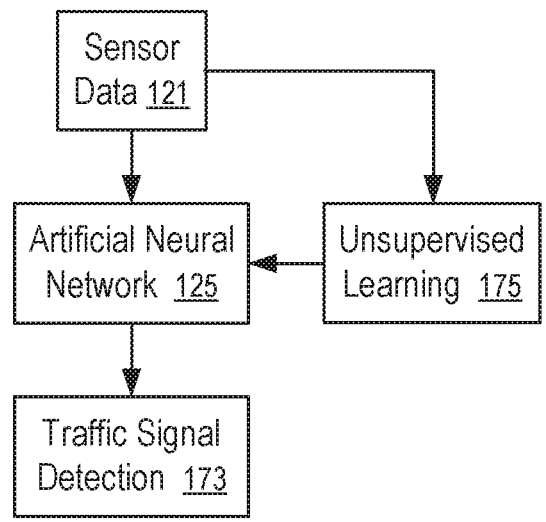
Figure 5:
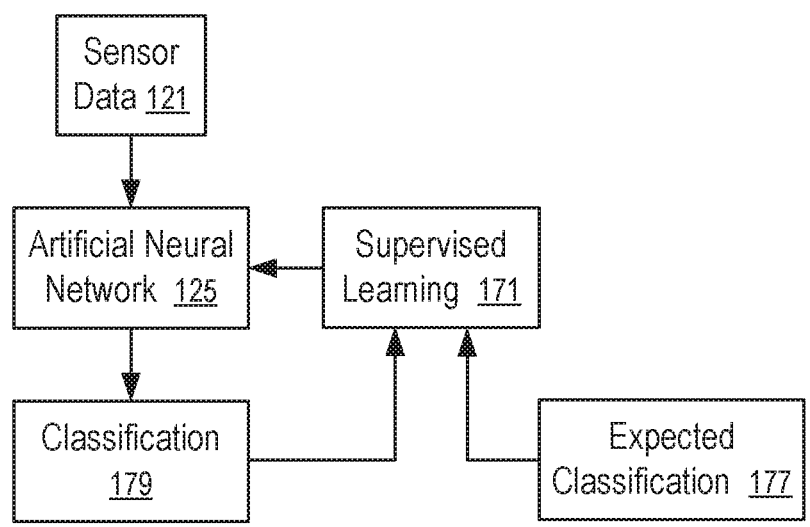

FIGS. 3-5 illustrate the training of artificial neural networks (125) for prediction according to some embodiments.

In FIG. 3, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include a classification of the type of objects (including signals) in the image.

The desired/expected inference result data (123) can be generated by a human operator. For example, the sensor data (121) can be used to construct a virtual reality demonstration of a situation encountered by the vehicle (111), including images from the image sensing device (101) showing an environment of the vehicle (111); and the desired/expected inference result data (123) can include classifications generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 3 can be applied in the server (119) based on the sensor data of a population of vehicles and corresponding desired/expected inference result data (123) to generate a generic ANN for the population of the vehicles.

The supervised learning (171) of FIG. 3 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/personalization of the ANN (125) in the vehicle (111).

In FIG. 4, a module (175) of unsupervised machine learning is used to train or refine an artificial neural network (125) to facilitate traffic signal detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognizing patterns in the sensor data (121) can be used to signal the detection (173) of a traffic signal.

For example, traffic signal detection (173) can be used to preserve the sensor data (121) associated with the traffic signal for further analysis. In response to traffic signal detection (173) in the vehicle (111), the computer system (131) can issue read command to the image sensing device (101) to retrieve image data associated with the traffic signal from the image sensing device (101) and store the retrieved image data in the data storage device (112). The image data associated with the traffic signal can be temporarily preserved in the memory device (107) of the image sensing device (101) and loaded to the data storage device (112) over a period of time using available communication bandwidth between the image sensing device (101) and the data storage device (112) without impacting the normal operations of the ADAS (105).

Optionally, a supervised machine learning (171) can be used to train the ANN (125), as illustrated in FIG. 5. The supervised learning (171) can be used to minimize the classification differences between the predictions (179) made using the ANN (125) according to the sensor data (121) and the expected classification (177).

Optionally, the integrated image sensing device (101) can be configured to accelerate the computations of a portion of the artificial neural network (ANN) (125) implemented via the inference engine (108).

For example, the inference engine (108) can include a neural network accelerator (159) specialized in performing at least part of the computations involving the artificial neural network (ANN) (125), such as dot-product of vectors and tensors, multiply and accumulation operations, etc. Optionally, some ANN processing not involving the images generated by the image sensor (109) can also be performed in the integrated image sensing device (101) (e.g., to reduce the computation load on the computer system (131) of the vehicle (111)).

The computations configured in the integrated image sensing device (101) can be used to reduce the amount of data to be transmitted to the processor(s) (133) to use or apply the ANN (125) and/or reduce the computation tasks of the processor(s) (133) in evaluating the outputs of the ANN (125) and/or in training the ANN (125). Such an arrangement can result in faster output from the integrated image sensing device (101) and/or lower energy usage since the data would not have to be moved in and out of the integrated image sensing device (101) to a dedicated, standalone neural network accelerator. The computation capability of the integrated image sensing device (101)) in processing data related to the ANN (125) enables the computer system (131) of the motor vehicle (111) to have computational resources and communication bandwidth for mission-critical tasks (e.g., autonomous driving by the ADAS (105)).

Figure 6:
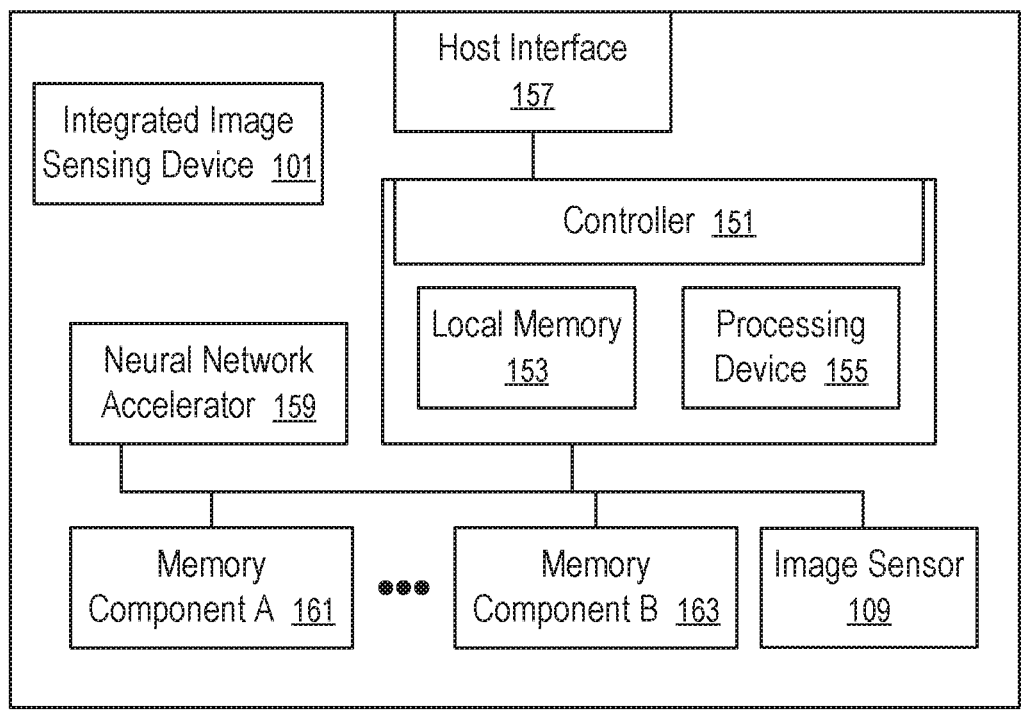
FIG. 6 illustrates an integrated image sensing device with a neural network accelerator according to one embodiment.

FIG. 6 shows an integrated image sensing device (101) with a neural network accelerator (159) according to one embodiment. For example, the integrated image sensing device (101) of FIG. 7 can be used to implement the image sensing device (101) of the vehicle (111) illustrated in FIG. 2 or 3.

In FIG. 6, the integrated image sensing device (101) has a host interface (157) configured to communicate with a host processor (e.g., 133 in FIG. 2) or a host system (e.g., 104 in FIG. 1). For example, the communication between the host processor (e.g., 133 or 104) and the host interface (157) can be, at least in part, in accordance with a communication protocol for a Peripheral Component Interconnect Express (PCIe) bus, a Serial Advanced Technology Attachment (SATA) bus, a Universal Serial Bus (USB) bus, and/or a Storage Area Network (SAN).

For example, the host interface (157) can be configured to be similar to a host interface of a data storage device (e.g., 112).

For example, the host computer system (131 or 104) can communicate with the host interface (157) to retrieve inference results generated by the integrated image sensing device (101) from the images from the image sensor (109), instead of the images, to reduce the data traffic going through the host interface (157).

Optionally, the host interface (157) can be further used to receive, in the image sensing device (101), sensor data (121) generated by other sensors of the vehicle (111); and the sensor data (121) and the images from the image sensor (109) are combined in a portion of the ANN (125) that is implemented in the integrated image sensing device (101) to generate inference results.

In FIG. 6, each of the memory components (161 to 163) can be a memory integrated circuit configured to store data. The integrated circuit dies of the memory components (161 to 163) can be stacked to the back of the image sensor (109), and through-silicon vias between the image sensor (109) and the integrated circuit dies of the memory components (161 to 163) can be used to provide high communication bandwidth for storing the images generated by the image sensor (109) into at least some of the memory components (161 to 163) for processing by the controller (151) and/or the neural network accelerator (159). For example, different sections of the image sensor (109) can store image data to different memory components (161 to 163), or different sections of a memory component (e.g., 161 or 163), using through-silicon vias.

The neural network accelerator (159) and the controller (151) can be implemented via logic circuits formed on one or more integrated circuit dies that are further stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the images stored in the memory components (161 to 163) to generate inference results. The inference results can be stored in the local memory (153) of the controller (151) and/or some of the memory components (161 to 163) for retrieval by the host system (104), such as the computer system (131) of the vehicle (111). For example, different memory components (161 to 163), or different sections of a memory component (e.g., 161 or 163), can use through-silicon vias to facilitate parallel access for different portions of the neural network accelerator (159), the controller (151), and the image sensor (109).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or the same type of memory.

Examples of non-volatile memory include flash memory, and memory units formed based on negative-and (NAND) logic gates, negative-or (NOR) logic gates, Phase-Change Memory (PCM), magnetic memory (MRAM), resistive random-access memory, cross point storage, and memory devices. A crosspoint (XPoint) memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other lay is in another direction and in the layer located below the memory element columns. Each memory element can be individually selected at a cross point of one wire on each of the two layers. Crosspoint memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The integrated image sensing device (101) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the integrated image sensing device (101) and the processor(s) (e.g., 133) of the vehicle (111), and other functions described herein. Optionally, the local memory (151) of the controller (151) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 6, the integrated image sensing device (101) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computational intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 7.

Figure 7:
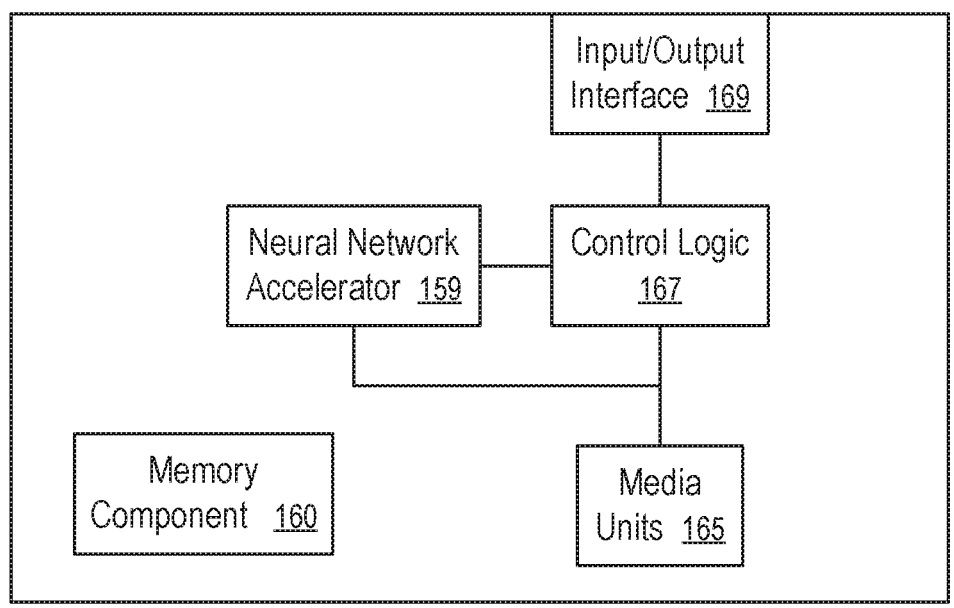
FIG. 7 illustrates a memory component to accelerate neural network computations according to one embodiment.

FIG. 7 shows a memory component (160) to accelerate neural network computations according to one embodiment. For example, each or some of the memory components (161 to 163) in FIG. 6 can be implemented using a memory component (160) of FIG. 7.

In FIG. 7, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 7, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the integrated image sensing device (101) and/or the processor(s) (133) can be configured to process the spiking of neurons and/or accumulation of inputs to the SNN.

For example, the image sensor (109) generates images at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the image sensor (109). The controller (151) processes the images in the memory components (161 to 163) according to the portion of ANN (125) to generate inference results. The inference results are stored in the memory components (161 to 163) and/or in the local memory (153) of the controller (151) for reading by the host system (104), such as the computer system (131) of the vehicle (111).

Optionally, the integrated image sensing device (101) further receives a sensor data stream from at least one sensor configured on the vehicle (111) and generate the inference results based on the sensor data stream and the images from the image sensor (109) according to the portion of ANN (125) stored in the memory components (161 to 163).

A neural network accelerator (159) configured within the integrated image sensing device (101) performs at least a portion of computations based on an artificial neural network (125), the images from the image sensor (109), and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the integrated image sensing device (101), or memory component (160, 161 or 163) of the integrated image sensing device (101).

The neural network accelerator (159) can be configured to perform computations, such as matrix arithmetic computations for ANN and/or or differential equation simulations for SNN, using data stored in the integrated image sensing device (101).

Examples of the matrix arithmetic computations include matrix multiplication and accumulation operations. After a computation to generate a result of the matrix arithmetic computations using a data stored in the integrated image sensing device (101), the neural network accelerator (159) can provide the result as output of the integrated image sensing device (101) in data retrieval operations (e.g., in response to a read command). Alternatively, or in combination, the result of the matrix arithmetic computation can be buffered in the integrated image sensing device (101) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect traffic signals.

The computations performed by the neural network accelerator (159) according to an Artificial Neural Network (ANN) (125) involve different types of data that have different patterns of usages of the integrated image sensing device (101).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the integrated image sensing device (101) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the integrated image sensing device (101) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the integrated image sensing device (101) of the vehicle (111) to update its prediction capability. The model data of the ANN (125) can also change during or after the training of the ANN (125) using a machine learning technique (e.g., 171 or 175). It is preferred to configure a memory separate partition or region of the integrated image sensing device (101) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 109) of the vehicle (111) but not by artificial neurons in the ANN (125). The external inputs can be saved in a cyclic fashion so that the input data of the most recent time period of a predetermined length of driving can be found in the integrated image sensing device (101). Thus, it is preferred to configure a separate memory partition or region of the integrated image sensing device (101) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the integrated image sensing device (101) is insufficient to hold the entire state variable data and/or the internal outputs, the integrated image sensing device (101) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the integrated image sensing device (101). External outputs and/or dynamic states of neurons can be stored selectively since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 8:
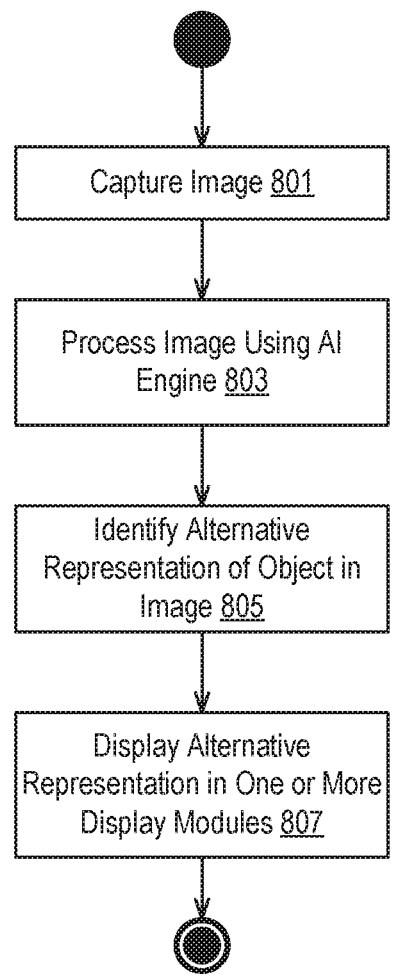
FIG. 8 is a flow diagram illustrating a method for displaying an alternative representation of a detected object according to one embodiment.

FIG. 8 is a flow diagram illustrating a method for displaying an alternative representation of a detected object according to one embodiment.

In block 801, the method captures an image.

In the illustrated embodiment, capturing an image comprises capturing an image (or frame of video) using an image sensor installed on a vehicle. In one embodiment, the method captures the image via an image sensor installed in a vehicle. In some embodiments, the method only captures the image while the vehicle is in motion. In some embodiments, the image comprises a rectangular or square image comprising a matrix of pixels, each having various values such as color, luminance, saturation, etc. In one embodiment, the image comprises an image of a roadway.

In some embodiments, the image captures an area of interest. Additionally, in some embodiments, the area of interest may or may not include an object of interest. As used herein, an object of interest generally refers to any object appearing in the area of interest. In some embodiments, the object of interest comprises a pre-defined object set in the memory of the vehicle. For example, the object of interest may comprise an object from a set of objects corresponding to traffic signals, signs, markers, or other shapes appearing on a roadway. In general, an object of interest can be defined by defining an AI/ML model that identifies an object of interest. Thus, in some embodiments, the method can be configured to detect any object of interest that can be modeled using an AI/ML model.

In block 803, the method processes the image using an AI engine.

In one embodiment, the AI engine is configured to identify objects of interest in the captured image. In one embodiment, the AI engine includes a model that is configured to identify the object of interest in the image based on identifying one or more colors in the image. Alternatively, or in conjunction with the foregoing, the method can identify the object of interest based on both identified colors as well as as shape. For example, in most scenarios, traffic signals and signage include significant color regions that enable quicker detection using computer vision models. For example, on a highway, a blue or green traffic sign is generally significantly larger than any other object captured by a vehicle's camera. Further, the colors used for most traffic signs do not appear in nature. In the illustrated embodiment, the AI engine can be trained using captured images from vehicles that have been analyzed to identify traffic objects (e.g., traffic signals and signs, lane markers, signals of other vehicles, construction signs, etc.) therein. These trained examples can then be used to build an ML model that can identify a bounding box surrounding such objects. Further, the training data can include color data that indicates what colors are in the traffic objects. While described primarily in terms of images and images captured by image sensors, the foregoing and following details may also be applied to other types of sensors recording other types of data. For example, Lidar, radar, sonar or other sensors may be utilized as sensors generating input processed in block 803.

As will be described in more detail, drivers with color blindness can have difficulties in identifying signs of certain colors. For example, such drivers generally cannot distinguish the colors of traffic signals easily and rely primarily on the position of lights when determining when a traffic signal is "green" or "red." Such techniques can result in miscues over time. Further, during evening hours, color-blind drivers can have greater difficulties distinguishing between colors.

In block 805, the method identifies an alternative representation of an object of interest in the image.

In the illustrated embodiment, this object is the one detected in block 803. The output of block 803 comprises an identifier representing the object and, if necessary, metadata describing the object. As one example, the method in block 803 may identify the presence of a traffic signal/light. This object may have metadata indicating the state of the light (i.e., the actively lit color). In some embodiments, such an object may actually be subcategorized into three objects: red, yellow, and green traffic signals/lights. Similarly, the method may identify one or more traffic signs and may categorize these signs based on the color of the sign (e.g., green for guide and information, blue for traveler services, yellow for warnings, white for regulatory, orange for temporary traffic control). In some embodiments, the method can perform optical character recognition on the sign data to obtain the text content of the sign. One or more of the color, location, and text of the sign may be stored as metadata. In yet another embodiment, the method in block 803 can identify signals from other vehicles such as brake lights, turn signals, etc. As one example, some drivers may have difficulties distinguishing at night between a normal brake light and an activated brake light indicating the vehicle is depressing the brake. In this scenario, the object comprises a brake light and the state (depressed, non-depressed) can be associated as metadata. Various other objects may be detected and the foregoing examples are not intended to be limiting.

Returning to block 805, the method receives the object and metadata and loads an alternative representation of the object and metadata. In one embodiment, the alternative representation is stored locally. In other embodiments, the alternative representation is stored remotely. In some embodiments, the alternative representation is synced with a remote server, thus providing up-to-date representations. In some embodiments, the alternative representations are stored as key-value objects wherein the key comprises an object identifier generated by the AI engine (as well as metadata if required) and the value comprises the representation.

In some embodiments, the alternative representation may comprise an alternative visualization of an object. In the illustrated embodiment, the alternative representation does not rely on color to distinguish between various states of the object or in any manner whatsoever. For example, instead of representing states of a traffic signal using colors, the alternative representation may represent the states using different shapes, different words, different positions in a fixed coordinate system, or another non-color representation. In some embodiments, the alternative representation may comprise a verbal signal (e.g., a voice instruction). In some embodiments, the alternative representation can comprise a haptic instruction (e.g., vibrating a steering wheel).

In the illustrated embodiment, the number of alternative representations is not limited to one. Indeed, the method may select multiple alternative representations based on the underlying output devices. Thus, if the method is configured to control an augmented reality (AR) display, one alternative representation may comprise a set of icons to display. If the method is also configured to play audio, the method will select a spoken word alternative representation.

In block 807, the method displays the alternative representation in one or more display modules. In some embodiments, the display modules correspond to those described in FIG. 1. Additionally, in some embodiments, the display module may comprise a speaker and the alternative representation comprise an audio file.

The following example of a traffic signal (light) is provided to illustrate the operation of the method of FIG. 8. As a user approaches the light, the camera records images (801) of the light (which is increasing in size as the user approaches). The camera identifies the object using the AI engine and determines its state based on the colors in the image (803). Initially, the light may be "green" and the method will load an alternative representation of a "green traffic light" which, as one example, may comprise an audible signal ("green light in X meters", where X is the distance to the light and can be identified based on the size of the traffic light and the user's speed or based on a roadway database) (805, 807). As the driver continues to approach the light, the light will change to "yellow." The method repeats the above steps and may issue an audible alert ("yellow light in X meters"). Additionally, the method may display a color-neutral warning on the dash ("Yellow Light Ahead"). Ultimately, the light will change to red. Upon capturing this image, the method may issue another audible alert (e.g., "red light ahead" and/or an alarm), issue a color-neutral warning on the dash ("Red Light. Stop") and generate a visualization of a stop sign in an AR display. The camera can then monitor the light until it turns green. Upon detecting this change, the method can disable the dash and AR display warnings and alert the user audibly ("Green Light, please proceed").

Certainly, the above examples are not limiting and various other permutations of alerts, signaling, and display modules may be employed.

Figure 9:
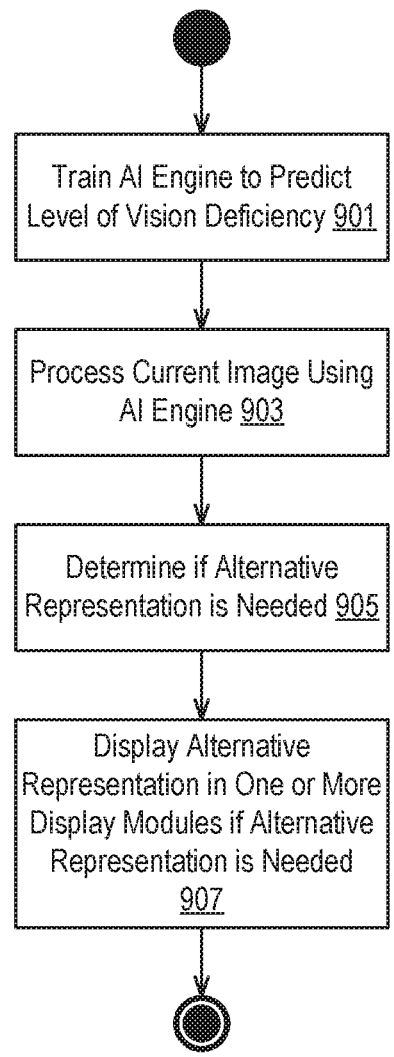
FIG. 9 is a flow diagram illustrating a method for training and using a machine learning model for displaying an alternative representation of a detected object according to one embodiment.

FIG. 9 is a flow diagram illustrating a method for training and using a machine learning model for displaying an alternative representation of a detected object according to one embodiment.

In the previous method described in FIG. 8, alternative representations are displayed for all detected objects (or a subset thereof). However, for some drivers, less than all objects may need alternative representations. The following method provides alternatives to reduce the number of alternative representations display to the driver.

In block 901, the method trains the AI engine to predict a level of deficiency.

In the illustrated embodiment, the method models the driver's level of color blindness. In this embodiment, the AI model may be trained by displaying a series of images to the driver and asking the driver to confirm an object in the image. The correct and incorrect answers can be used as labeled training data to train a model to detect, for a new image, whether the driver is likely to not recognize the object or to only have limited recognition of objects. In this manner, the AI engine receives a captured image and first classifies the images as likely to not be recognized by the user based on the training data. In some embodiments, the method may further employ a refinement procedure to update training data based on the user's driving behavior. For example, the method may determine whether a user has obeyed traffic signals, missed exits required by a GPS route, collided with stopped vehicles, etc. In these scenarios, the method detects an event that either correlates or is not correlated with an expected action based on a detected object and then uses this correlation or lack of correlation with a positive, or negative, label (respectively). The image containing the detected object is then assigned the label and used as further training data. As a concrete example, if the detected object is a "red" traffic light, the method expects a user to stop at the light. If the method determines that the user does not stop (e.g., by monitoring speed, brake pedal depression, etc.) the method retrieves the image(s) of the red traffic light and labels them as missed objects. These labeled images are then used to re-train the AI model.

In some embodiments, the AI model trained in 901 comprises a model separate from the model used in FIG. 8. In other embodiments, the models can be combined, thus forming per-user models.

In block 903, the method processes a current image using the AI engine. In the illustrated embodiment, the processing of block 903 comprises inputting the current image into the model trained in block 901. The output of the model comprises a confidence level indicating whether the user will not detect the object or not based on the user's level of color blindness.

In block 905, the method determines if an alternative representation is needed.

In one embodiment, the method analyzes the confidence level of the output of the AI model using the model trained in block 901. If the confidence level is low, indicating that the user will not detect an object in the given image, the method will proceed to block 907. Otherwise, the method will forego generating alternative representations.

In block 907, the method displays the alternative representation in one or more display modules. In some embodiments, the display modules correspond to those described in FIG. 1. Additionally, in some embodiments, the display module may comprise a speaker and the alternative representation comprise an audio file. In general, block 907 is performed in the same manner described above and those details are not repeated herein. However, as indicated, block 907 is conditionally executed only when the determining in block 905 indicates that such a representation is needed.

The present disclosure includes methods and apparatuses which perform the methods described above, including data processing systems which perform these methods, and computer-readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium (e.g., 112, 136) can be used to store software and data which when executed by a data processing system causes the system to perform various methods (e.g., FIGS. 8 and 9). The executable software and data may be stored in various places including for example ROM, volatile RAM, non-volatile memory and/or cache (e.g., 112, 136, 147, 153, 161, 163, 160). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
capturing an image, the image including an object of interest;
determining that a level of color blindness deficiency of a user exceeds a threshold value, the level of color blindness comprising a confidence value output by a classification model in response to the image, the classification model trained using images previously labeled by the user during a training phase, a given label comprising a user detection of an object within a given image, and wherein the classification model is further trained based on the given label successfully identifying a first object in one of the images and on a failure of the user to correctly identify a second object in one of the images;
identifying the object of interest in the image based on identifying one or more colors in the image;
associating the object of interest with a known traffic object;
identifying a color-neutral representation of the known traffic object; and
displaying the color-neutral representation to the user.

2. The method of claim 1, the capturing the image comprising capturing an image of a roadway while a vehicle is in motion, the capturing performed by a camera sensor installed in the vehicle.

3. The method of claim 1, the identifying the object of interest in the image based on identifying one or more colors in the image comprising inputting the image into a machine learning (ML) model, the ML model configured to output a type of object of interest.

4. The method of claim 1, the displaying the color-neutral representation comprising associating icons with each of the one or more colors.

5. The method of claim 1, the displaying the color-neutral representation comprising associating text labels with each of the one or more colors.

6. The method of claim 5, the displaying the color-neutral representation further comprising associating a position with each label in the text labels.

7. The method of claim 1, the displaying the color-neutral representation to the user comprising displaying the color-neutral representation on a display selected from a group consisting of an augmented reality (AR) display, a windshield, an instrument panel, and an infotainment system.

8. A non-transitory computer-readable storage medium for tangibly storing computer program instructions capable of being executed by a computer processor, the computer program instructions defining steps of:
capturing an image, the image including an object of interest;
determining that a level of color blindness deficiency of a user exceeds a threshold value, the level of color blindness comprising a confidence value output by a classification model in response to the image, the classification model trained using images previously correctly and incorrectly labeled by the user during a training phase, a given label comprising either a user detection of a given object within a given image or a failure to detect the given object within the given image;
identifying the object of interest in the image based on identifying one or more colors in the image;
associating the object of interest with a known traffic object;
identifying a color-neutral representation of the known traffic object; and
displaying the color-neutral representation to the user.

9. The computer-readable storage medium of claim 8, the capturing the image comprising capturing an image of a roadway while a vehicle is in motion, the capturing performed by a camera sensor installed in the vehicle.

10. The computer-readable storage medium of claim 8, the identifying the object of interest in the image based on identifying one or more colors in the image comprising inputting the image into a machine learning (ML) model, the ML model configured to output a type of object of interest.

11. The computer-readable storage medium of claim 8, the displaying the color-neutral representation comprising associating icons with each of the one or more colors.

12. The computer-readable storage medium of claim 8, the displaying the color-neutral representation comprising associating text labels and associated positions with each of the one or more colors.

13. The computer-readable storage medium of claim 8, the displaying the color-neutral representation to the user comprising displaying the color-neutral representation on a display selected from a group consisting of an augmented reality (AR) display, a windshield, an instrument panel, and an infotainment system.

14. An apparatus comprising:
a processor; and
a storage medium for tangibly storing thereon program logic for execution by the processor, the stored program logic comprising logic for:
capturing an image, the image including an object of interest,
determining that a level of color blindness deficiency of a user exceeds a threshold value, the level of color blindness comprising a confidence value output by a classification model in response to the image, the classification model trained using labeled images, the labeled images comprising information about whether the user previously successfully identified objects within at least one given image,
identifying the object of interest in the image based on identifying one or more colors in the image,
associating the object of interest with a known traffic object,
identifying a color-neutral representation of the known traffic object, and
displaying the color-neutral representation to the user.

15. The apparatus of claim 14, the identifying the object of interest in the image based on identifying one or more colors in the image comprising inputting the image into a machine learning (ML) model, the ML model configured to output a type of object of interest.

16. The apparatus of claim 14, the displaying the color-neutral representation comprising associating icons with each of the one or more colors.

17. The apparatus of claim 14, the displaying the color-neutral representation comprising associating text labels and associated positions with each of the one or more colors.

18. The method of claim 1, wherein the classification model is further trained to determine the level of color blindness based on the given label successfully identifying the first object in one of the images and on the failure of the user to correctly identify the second object in one of the images.

19. The method of claim 1, wherein the training phase comprises presenting unlabeled images to the user, receiving labels from the user with respect to each of the unlabeled images, determining whether each of the labels successfully identifies an object in one of the images or fails to successfully identify the object in one of the images, and training the classification model using the images labeled by the user, the labels, and information indicative of whether each label is correct or not.

20. The method of claim 1, wherein the identifying the object of interest comprises determining, based on the level of color blindness of the user that the user object of interest.

* * * * *